United States Patent
Caillaud et al.

(10) Patent No.: US 9,438,154 B2
(45) Date of Patent: Sep. 6, 2016

(54) METHOD AND DEVICE FOR CONTROLLING A MOTOR VEHICLE WINDSCREEN WIPER MOTOR

(71) Applicant: Valeo Systèmes d'Essuyage, Le Mesnil Saint Denis (FR)

(72) Inventors: Dominique Caillaud, Châtellerault (FR); Frédéric Floquet, Coussay-les-Bois (FR); Pierre Pilard, Saint Remy sur Creuse (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 14/386,485

(22) PCT Filed: Mar. 19, 2013

(86) PCT No.: PCT/EP2013/055682
§ 371 (c)(1),
(2) Date: Sep. 19, 2014

(87) PCT Pub. No.: WO2013/139785
PCT Pub. Date: Sep. 26, 2013

(65) Prior Publication Data
US 2015/0048771 A1    Feb. 19, 2015

(30) Foreign Application Priority Data
Mar. 21, 2012 (FR) .................. 12 00845

(51) Int. Cl.
G05B 11/28    (2006.01)
H02P 7/06    (2006.01)
B60S 1/08    (2006.01)
H02P 7/29    (2016.01)

(52) U.S. Cl.
CPC . H02P 7/06 (2013.01); B60S 1/08 (2013.01); H02P 7/29 (2013.01)

(58) Field of Classification Search
CPC ............ H02P 1/04; H02P 6/14; H02P 27/06; G05B 11/28; H02M 1/44
USPC ....... 318/560, 599, 255, 256, 280, 286, 441, 318/442, 266, 466, 468, 483, 811, 400.01, 318/400.14, 128, 400.23, 400.24, 400.25, 318/807; 388/800, 811, 819, 823
See application file for complete search history.

(56) References Cited

U.S. PATENT DOCUMENTS 4,339,697 A * 7/1982 Franz .................. H02P 7/29
                                                    318/139
4,663,575 A   5/1987 Juszwik et al.
(Continued)

OTHER PUBLICATIONS

International Search Report issued in PCT/EP2013/055682 mailed on Apr. 19, 2013 (4 pages).

*Primary Examiner* — Antony M Paul
(74) *Attorney, Agent, or Firm* — Osha Liang LLP

(57) ABSTRACT

Method of controlling a motor vehicle windscreen wiper motor, powered and controlled by pulse width modulation (PWM) with duty ratio (T) of determined value, in which the instantaneous fundamental period of the modulated pulses is switched successively between at least two discrete period values (T1, T2), the duty ratio (T) of the pulses (PWM) being substantially established at a determined value for at least one determined duration (Tc) of switching of the modulated pulses. Application to the reduction of the EMC noise level in the radio frequency bands to be protected.

15 Claims, 4 Drawing Sheets

(56) References Cited

U.S. PATENT DOCUMENTS

| | | | |
|---|---|---|---|
| 4,705,997 A * | 11/1987 | Juzswik | 388/811 |
| 5,506,483 A | 4/1996 | McCann et al. | |
| 5,857,060 A | 1/1999 | Elliott et al. | |
| 8,072,180 B1 * | 12/2011 | Sachs | G01R 19/2506 318/807 |
| 2003/0142963 A1 * | 7/2003 | Nadeau | 388/804 |
| 2010/0201299 A1 * | 8/2010 | Emde et al. | 318/503 |

* cited by examiner

METHOD AND DEVICE FOR CONTROLLING A MOTOR VEHICLE WINDSCREEN WIPER MOTOR

The invention relates to a method and a device for controlling a windshield wiper motor of an automobile vehicle allowing, notably, the electromagnetic compatibility noise, denoted EMC noise, to be reduced.

The windshield wiper motors of current automobile vehicles are still, for the most part, DC motors powered by a DC power supply voltage, originating from the battery of the vehicle, for the oldest vehicles. The switching of the wipers over the sectors of the collector and the mechanical switching back and forth of the windshield wiper action generate switching noise. This switching noise constitutes EMC interference noise, which is particularly detrimental not only to the reception of and to the listening to radiophonic broadcasts onboard the vehicle, notably in amplitude modulation or else in frequency modulation, but also to the correct operation of the electronic circuits ever more presents in today's automobile vehicles.

In order to overcome such a drawback, notably in the construction of the most modern of today's automobile vehicles, aside from the analog filtering of the EMC interference noise, the DC power supply of the windshield wiper motors and the to and fro mechanical switching has been replaced by a power supply using pulse-width modulation, denoted PWM, and the electronic control of the motor has been provided by means of a circuit denoted H bridge.

Such a power supply mode, based on a fixed pulse frequency for example in the range between 15 kHz and 20 kHz, by adjustment of the duty cycle of the pulses, allows the speed of rotation of the windshield wiper motor to be varied, and, finally, the utilization of the windshield wipers and the solicitation of the wiping of the window, windshield of the vehicle, to be modulated as a function of the degree of humidity, of soiling of the latter, or else of parameters external to the vehicle.

By way of non-limiting example, for a frequency of the modulated pulses taken equal to 20 kHz, a duty cycle taken equal to 80% allows, for a period of the pulses equal to 50 µs, a power supply of the windshield wiper motor to be established at the nominal voltage, battery voltage, for a period of 40 µs and an absence of power supply for a period of 10 µs. The period or the frequency of the modulated pulses is fixed and different depending on the models of automobile vehicles, according to the manufacturers of the latter.

Such a switching at a fixed fundamental frequency, 20 kHz for example, however generates a substantially continuous emission of EMC interference noise notably in the radio frequency bands, as is shown in FIG. 1, owing to the substantially continuous generation of harmonic signals or lines of very high order.

The amplitude or the energy level W of the electric field of this interference noise, as is shown in the aforementioned FIG. 1, is greater than 35 dBµV/m in LW (Long Wave) amplitude modulation radio frequency band, in the range between 150 kHz and 280 kHz, and greater than 12 dBµV/m in the MW (Medium Wave) amplitude modulation radio frequency band, in the range between 530 kHz and 1.7 MHz.

The generation of such levels of EMC noise is detrimental not only to the reception of radio broadcasts within the current vehicles, but also to the correct operation of the electronic circuits and onboard computer of the latter.

One subject of the present invention is a the implementation of a method and a device for controlling a windshield wiper motor of an automobile vehicle, powered and controlled in pulse-width modulation mode with a duty cycle of given value allowing a highly flexible selective choice of either the period (or the frequency), or of the duty cycle of the modulated pulses, or else of the period (or the frequency) and of the duty cycle of the modulated pulses, with the aim of an optimum utilization of the windshield wiper function of the vehicle, accompanied by a substantial reduction of the level of emission of electromagnetic noise generated by the latter.

Another subject of the present invention is, in particular, the implementation of a method and of a device for controlling a windshield wiper motor of an automobile vehicle allowing, aside from any filtering operation, the level of emission of electromagnetic noise from the windshield wiper function of any automobile vehicle to be significantly reduced in radio frequency bands, notably amplitude modulation and/or frequency modulation bands.

Another subject of the present invention is also the implementation of a method and a device for controlling a windshield wiper motor of an automobile vehicle allowing not only the aforementioned reduction in the level of emission of electromagnetic noise to be obtained, but also of introduire a substantial facility for programming parameterization of the use of the windshield wiper function of the vehicle, as a function of the environmental parameters outside of the vehicle, such as degree of humidity or of soiling of the windshield, temperature outside of the vehicle, for example.

The method for controlling a windshield wiper motor of an automobile vehicle, powered and controlled in pulse-width modulation mode with a duty cycle of given value, subject of the invention, is noteworthy in that it consists in successively switching the instantaneous fundamental period of the modulated pulses between at least two discrete values of period, the duty cycle of the pulses being substantially established at a given value, for at least one given switching period of the modulated pulses.

The method, subject of the invention, is also noteworthy in that, for an instantaneous fundamental period and a corresponding instantaneous fundamental frequency of the modulated pulses, this instantaneous fundamental frequency is chosen so as to minimize the level of electromagnetic noise generated by the harmonic lines of this instantaneous fundamental frequency within a band of frequencies to be protected of given value.

The method, subject of the invention, is also noteworthy in that two successive instantaneous fundamental frequencies of the modulation pulses of two successive switching periods are separated by a frequency jump included between a minimum value and a maximum value of frequency, the minimum and maximum values of frequency being a function of the band of frequencies to be protected.

The method, subject of the invention, is also noteworthy in that, for a given band of frequencies to be protected, the maximum value of frequency bounding the frequency jump separating two successive instantaneous fundamental frequencies is such that harmonic frequencies of the two successive instantaneous fundamental frequencies are distinct and separated by a band width greater than a value of measurement resolution frequency band of the electromagnetic noise.

The method, subject of the invention, is furthermore noteworthy in that, for a given band of frequencies to be protected, the minimum value of frequency separating two successive instantaneous fundamental frequencies is such that the distance between the harmonic lines of higher order is substantially equal to a value of measurement resolution frequency band of the electromagnetic noise.

The method, subject of the invention, is furthermore noteworthy in that the switching period over at least two discrete period values is less than the duration of measurement of the electromagnetic noise.

The method, subject of the invention, is furthermore noteworthy in that, for a plurality greater than two of discrete period values for the modulated pulses, the latter consists in switching the value of the instantaneous fundamental period of the pulses modulated over one of the discrete period values, onto a series of successive switching periods.

The method, subject of the invention, is furthermore noteworthy in that the switching is a cyclic switching.

The method, subject of the invention, is also noteworthy in that the switching is a pseudo-random switching.

The method, subject of the invention, is lastly noteworthy in that the latter furthermore consists in selecting, over at least one given switching period, the value of the duty cycle of the modulated pulses.

The device for controlling a windshield wiper motor of an automobile vehicle powered and controlled in pulse-width modulation mode by means of an H bridge, subject of the invention, is noteworthy in that it comprises at least:
  means for selecting and successive switching of the instantaneous fundamental period of the modulated pulses between at least two discrete period values, for at least one given switching period; and,
  means for selecting and for controlling the duty cycle of the modulated pulses for at least one switching period of the modulated pulses.

The device, subject of the invention, is also noteworthy in that the means for selecting and successive switching of the instantaneous fundamental period of the modulated pulses comprise at least:
  one input circuit for the choice of the period value, connected to
  one register for selecting the value of instantaneous fundamental period of the modulated pulses from amongst a plurality of given period values, this register controlling the H bridge.

The device, subject of the invention, is also noteworthy in that the means for selecting and for switching the duty cycle of the modulated pulses comprise at least:
  one input circuit for the choice of the value of the duty cycle of the modulated pulses; and,
  one register for selection of the duty cycle of the modulated pulses from amongst a plurality of given values of duty cycle.

The device, subject of the invention, is also noteworthy in that it furthermore comprises a circuit for sequential discrimination of a value of instantaneous fundamental period from amongst a plurality of given period values.

The device, subject of the invention, is lastly noteworthy in that it comprises a circuit for pseudo-random discrimination of a value of instantaneous fundamental period from amongst a plurality of given period values.

The method and the device for controlling a windshield wiper motor of an automobile vehicle, subjects of the present invention, will be better understood upon reading the description and upon observing the appended drawings in which:

FIG. 2b shows the frequency diagram of the spectrum of the emitted frequencies and of at least one of their harmonics of high order, during the implementation of the method, subject of the invention, such as illustrated in FIG. 2a;

FIG. 3 shows a comparative diagram, with regard to FIG. 1, of the spectrum of frequencies of the EMC noise emissions obtained for long-wave and medium-wave radio frequency bands, thanks to the implementation of the method, subject of the invention, such as illustrated in FIG. 2a;

The method for controlling a windshield wiper motor of an automobile vehicle, according to the subject of the invention, is now described with reference to FIGS. 2a, 2b and to the following figures.

Figure 2A:
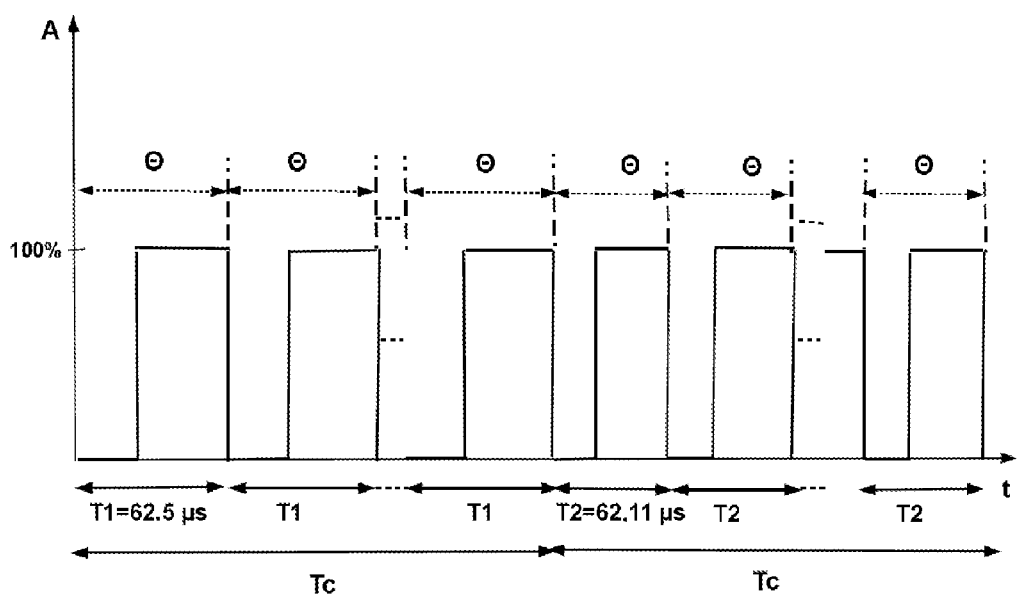
FIG. 2a shows, by way of example, a timing diagram of the signals for modulation by pulses of a power supply of a windshield wiper motor of an automobile vehicle obtained thanks to the implementation of the method, subject of the invention, in a first non-limiting embodiment.

With reference to FIG. 2a, the method, subject of the invention, enables the control of an automobile vehicle windshield wiper motor powered and controlled in pulse-width modulation mode with a duty cycle $\ominus$ of given value. In the aforementioned figure, the abscissa axis is graduated in time t, and the ordinate axis in amplitude A, in other words in relative value of voltage of the modulated pulses.

According to a noteworthy aspect of the method, subject of the invention, the latter consists in successively switching the instantaneous fundamental period of the modulated pulses between at least two discrete period values, denoted T1 and T2 in the aforementioned figure. Generally speaking, it is indicated that the number of discrete period values is not limited to two, the successive switching being able to be advantageously applied based on any number of discrete period values, as will be described later on in the description.

More specifically, it is indicated that the switching operation takes place for a duty cycle of the pulses substantially established at a given value, the value $\ominus$ previously mentioned corresponding to a given specific wiper function depending on the conditions outside the vehicle.

According to one noteworthy feature of the method, subject of the invention, the aforementioned switching takes place for at least one given switching period, denoted Tc, of the modulated pulses.

Upon observing FIG. 2a, it will be understood, by way of non-limiting example, that the first instantaneous fundamental period of value T1=62.5 µs is maintained during the switching period Tc, that the switching with selection of the second period of value T2=62.11 µs takes place, following the aforementioned switching, after the switching period Tc, and is maintained substantially during the same switching period Tc, and so forth and so on, in alternation, for the aforementioned period values T1 and T2, the value of the duty cycle ⊖ being maintained during these switching operations.

The aforementioned operating procedure, owing to the switching of the values of instantaneous fundamental period of the modulated pulses, allows the emission lines of harmonic frequencies of the fundamental frequencies generated by the modulation of the pulses at the fundamental frequencies f01 and f02 of modulation of the modulated pulses with periods T1 and T2 to be diversified, with respect to a modulation of the pulses at a single instantaneous fundamental frequency of the modulation of the modulated pulses at a given single period value of the prior art. It will be understood, in particular, that, owing to the diversification of the aforementioned emission lines, the method, subject of the invention, allows the overall energy level of the EMC interference noise to be significantly reduced within a given radio frequency band to be protected, for example.

Generally speaking, in the present description, the terms 'fundamental period' or 'fundamental frequency' of the modulated pulses will be used interchangeably, these two notions being equivalent, the notion of fundamental period of the modulated pulses being more particularly reserved for the description of the signature of the control signal or of the modulated pulses, such as shown in FIG. 2a for example, and the notion of fundamental frequency being more particularly reserved for each fundamental frequency and for the harmonic lines of the latter generated owing to the modulation of the modulated pulses at the corresponding value of fundamental period.

Figure 2B:
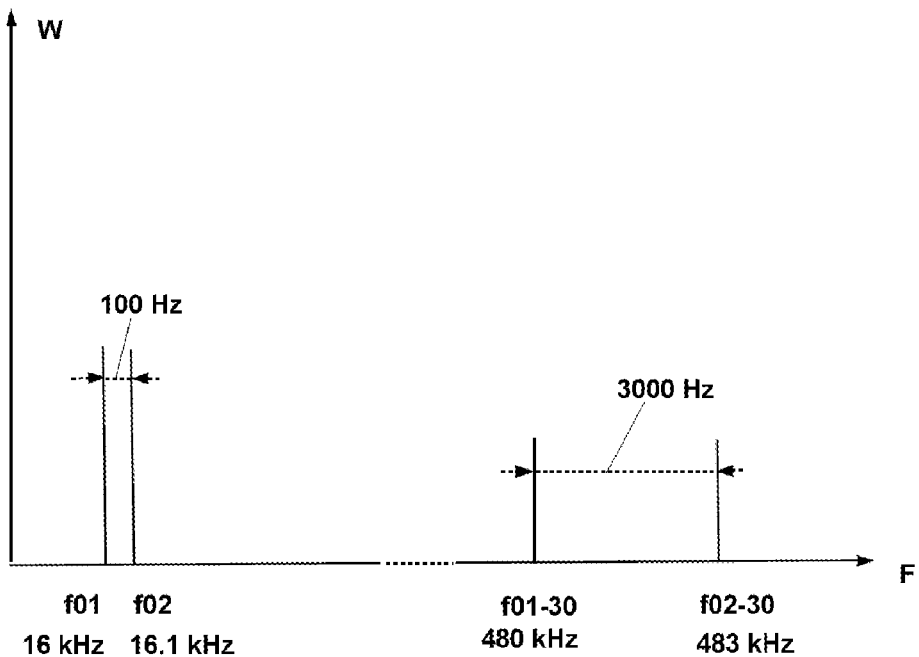

FIG. 2b shows, by way of example, the spectrum of the frequencies of the modulated pulses at the first value of instantaneous fundamental period T1, respectively at the second value of instantaneous fundamental period T2, the abscissa axis in FIG. 2b being graduated in of values of frequency measured in kHz and the ordinate axis in values of energy W.

With reference to FIG. 2b, it is indicated that the instantaneous fundamental frequency of the modulated pulses at the first period value T1=62.5 µs corresponds to a fundamental frequency f01=16 kHz and that the instantaneous frequency of the modulated pulses at the second period value T2=62.11 µs corresponds to a fundamental frequency f02=16.1 kHz and that the harmonic lines of order 30 of the latter have the value f01-30=480 kHz and f02-30=483 kHz respectively, these two harmonic lines being separated by 3000 Hz.

It will thus be understood that, for an instantaneous fundamental period T1, T2 and a corresponding instantaneous fundamental frequency f01, f02 of the modulated pulses, these corresponding instantaneous fundamental frequencies f01, f02 are chosen in such a manner as to minimize the level of electromagnetic noise generated by the harmonic lines of these instantaneous fundamental frequencies, within a band of frequencies to be protected of given value.

Upon observing FIG. 2b, it will be understood that the spacing of the harmonic lines f01-30 and f02-30, as a minimum equal to 3000 Hz in the neighborhood of the lower limit of the medium-wave MW frequency band to be protected, allows, for any harmonic line of order higher than 30, the interference energy density generated by these harmonic lines to be reduced in the aforementioned band of frequencies to be protected.

Thus, two successive instantaneous fundamental frequencies f01 and f02 of modulation of the modulation pulses over two successive switching periods Tc are separated by a frequency jump, 100 Hz, in the example in FIGS. 2a and 2b, this frequency jump being included between a minimum value and a maximum value of frequencies, these minimum and maximum values being a function of the band of frequencies to be protected.

More specifically, it is indicated that the maximum value of frequency bounding the frequency jump separating two successive instantaneous fundamental frequencies is such that the harmonic frequencies of the two successive instantaneous fundamental frequencies are distinct and separated by a band width greater than a value of measurement resolution frequency band of the electromagnetic noise EMC, in the band of frequencies to be protected.

With reference to the example in FIGS. 2a and 2b, it may be observed that the distance between harmonic lines, for the band of frequencies to be protected in the medium wave MW in the range between 530 kHz and 1.7 MHz, distance greater than 3000 Hz, is greater than the measurement resolution frequency band of the electromagnetic noise, RBW, taken equal to 1000 Hz.

Furthermore, the minimum value of frequencies separating two successive instantaneous fundamental frequencies is such that the distance between the harmonic lines of higher order is substantially equal to a value of measurement resolution frequency band of the electromagnetic noise EMC.

The measurement of the noise for each measurement point in the band of frequencies to be protected is carried out by scanning over a measurement scanning time taken equal to 20 ms for various points of frequency values of given value.

Lastly, each switching period Tc is less than the measurement scanning time, taken equal to 20 ms, where each switching period Tc may, for example, be taken equal to 10 ms. Thus, the switching period Tc for at least two discrete period values T1, T2 is less than the time for measurement of the electromagnetic noise.

Figure 2C:
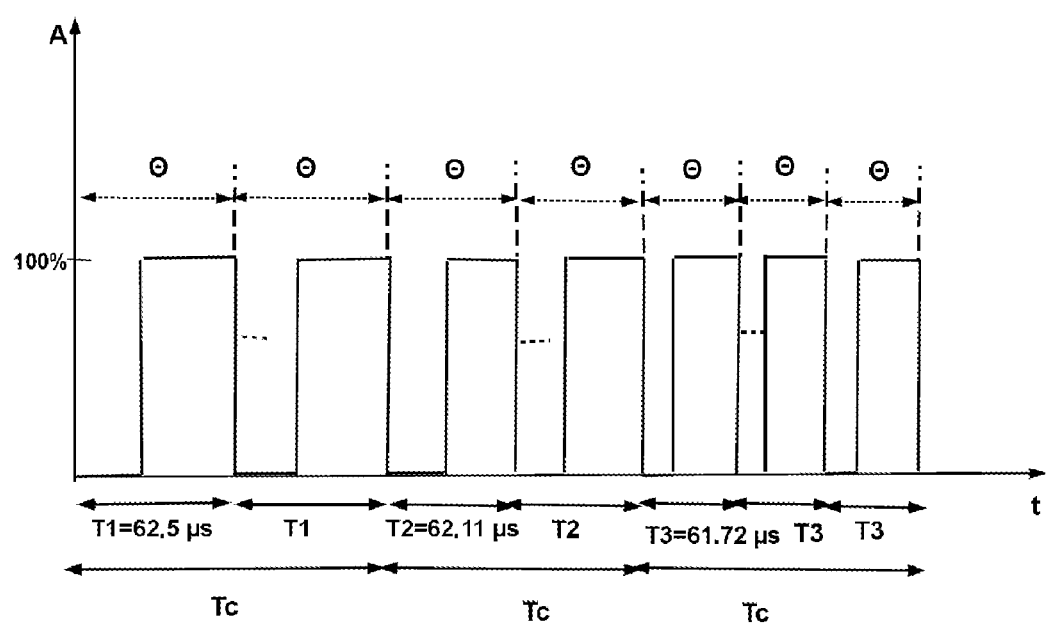
FIG. 2c shows a timing diagram of the signals for modulation of the pulses supplying power to a windshield wiper motor of an automobile vehicle obtained thanks to the implementation of the method, subject of the invention, in a second non-limiting embodiment.

The method, subject of the invention, is not limited to the switching of the fundamental period of the modulated pulses between two discrete period values. Thus, with reference to FIG. 2c, a number of discrete period values taken equal to 3 or even higher may be implemented.

In this case, the value of the periods T1 and T2, as indicated with reference to FIG. 2a, may be kept, where the value of the period T3 may, for example, be taken equal to 61.72 µs, in such a manner as to generate harmonic lines of higher order separated by a value greater than 3000 Hz in the band of frequencies to be protected.

More specifically, it is indicated that the switching period Tc may be taken equal to 10 ms and may correspond, advantageously, to an integer number of values of the selected period. This measurement is obtained by synchronization of the switching period Tc and of the modulated pulses and allows synchronous transitions of the switching periods and of the modulated pulses to be obtained.

Thus, the method, subject of the invention, may be implemented for a plurality of a number N of discrete period values of the modulated pulses. In this case, it consists in switching the value of the instantaneous fundamental period of the modulated pulses over one of the discrete period values, for a series of successive switching periods.

The execution of the switching per se of the discrete period values may be carried out according to a cyclic switching. In this case, the harmonic lines of each instantaneous fundamental frequency allow the energy density of the harmonic lines to be reduced and hence the corresponding overall level of EMC noise over the band of frequencies to be protected. However, the process of cyclic switching is likely to introduce a repetition of the levels of noise corresponding to the aforementioned harmonic lines.

According to one advantageous non-limiting embodiment, the execution of the switching per se of the discrete period values may, on the contrary, be carried out according to a pseudo-random switching. Such a process may be implemented by pseudo-random selection of the period of the modulated pulses, from amongst the plurality of the N discrete period values previously mentioned. Such a operating procedure allows the risk of repetition of the level of noise previously mentioned to be substantially overcome, and indeed, the overall reduction in the level of emission of the EMC noise finally generated to be optimized over the band of frequencies to be protected. Such a operating procedure will be described in more detail further on in the description.

Figure 2D:
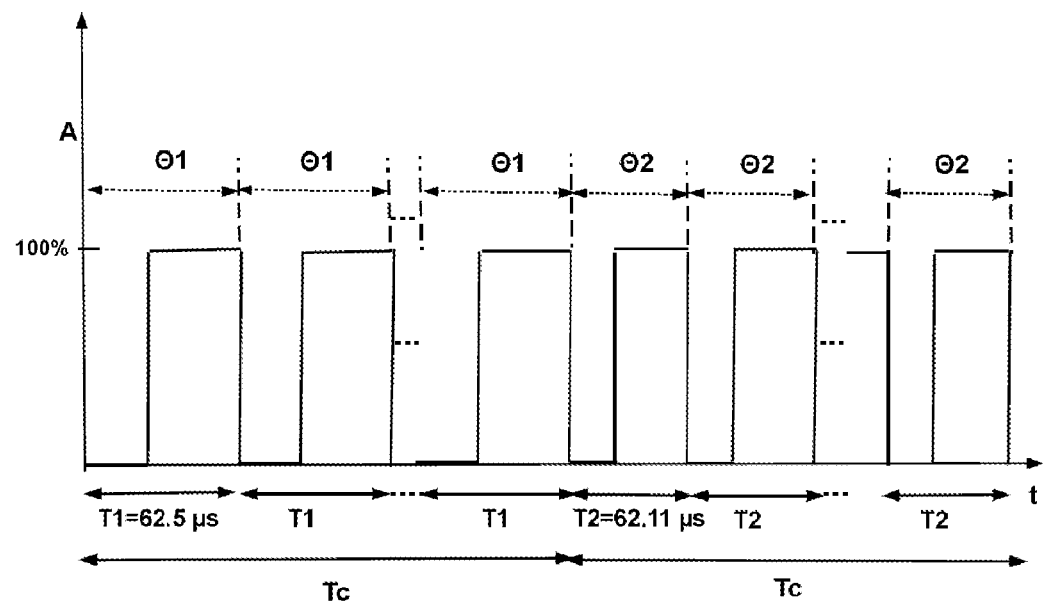
FIG. 2d shows a timing diagram of the signals for modulation of the pulses supplying power to a windshield wiper motor of an automobile vehicle obtained thanks to the implementation of the method, subject of the invention, in a third non-limiting embodiment.

According to another particularly noteworthy aspect of the method, subject of the present invention, as is shown in relation to FIG. 2d, the latter furthermore consists, in a particularly advantageous manner, in selecting for at least one switching period Tc, the value of the duty cycle $\ominus$ of the modulated pulses. It will of course be understood that such a operating procedure is possible because, for the implementation of the method, subject of the invention, the variables of period and of duty cycle of the modulated pulses are taken as independent variables.

It will then be understood that the choice of the value of the duty cycle $\ominus$ for at least one switching period Tc may be maintained for a succession of switching periods, in order to execute a specific wiper function for the windshield of the vehicle for example, depending on the conditions external to the latter, such as degree of humidity or of soiling, efficiency of the wiping of the windshield wiper function for example.

The operating procedure consisting in selecting, for at least one given switching period, the value of the duty cycle of the modulated pulses is shown in FIG. 2d for the two discrete period values T1 and T2 in FIG. 2a in a non-limiting manner, the choice and the switching of the value of the duty cycle corresponding arbitrarily to the switching of the period values T1 and T2. Such a operating procedure is not indispensable and it is of course possible to assign either the value of the duty cycle selected for a plurality of switching periods Tc, or conversely, the value of the period of the modulated pulses for a separate plurality of switching periods Tc, the switching operations of the instantaneous fundamental period and of the values of duty cycle being time-shifted by an integer number of separate instantaneous fundamental period values, for example.

Figure 1:
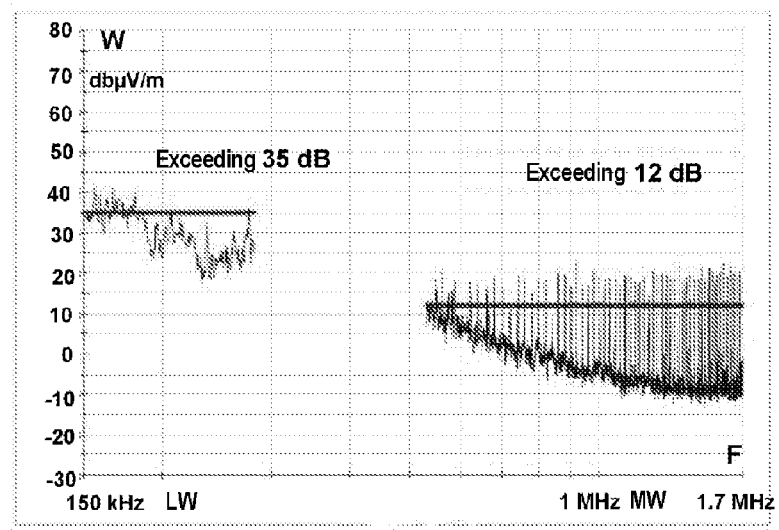
FIG. 1 shows a continuous emission of EMC interference noise notably in the radio frequency bands generated from a switching at a fixed fundamental frequency in the prior art system.
Figure 3:
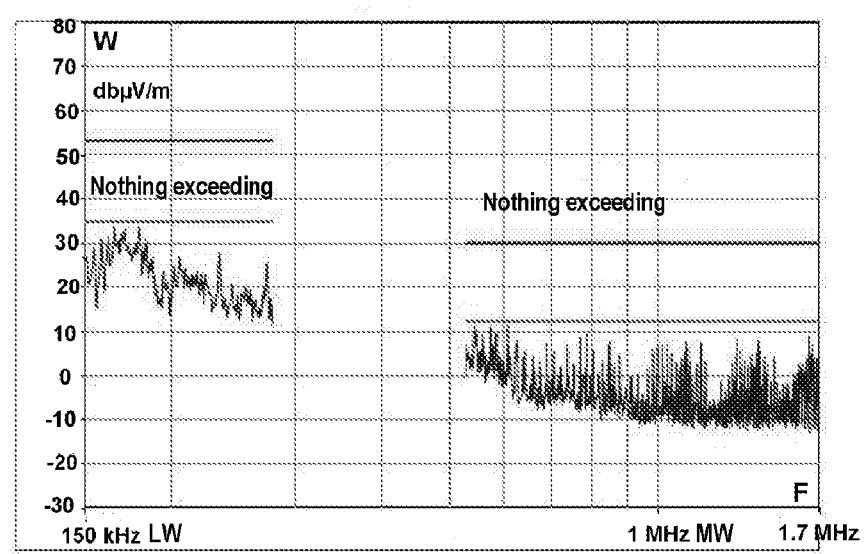

FIG. 3 shows a comparative diagram, with respect to FIG. 1, of the spectrum of noise frequencies obtained in the presence of the implementation of the method, subject of the invention, for the band of frequencies to be protected corresponding to the long-wave band, LW, respectively for the band of frequencies to be protected corresponding to the medium-wave band, MW. As in the case of FIG. 1, in FIG. 3 the abscissa axis is graduated in frequencies, according to a logarithmic scale shown between 150 kHz and 1.7 MHz, and the ordinate axis is graduated in energy of the harmonic lines, measured as a relative value of attenuation of the electric field of the latter in dBµV/m. The comparison of the frequency spectrum diagrams in FIGS. 1 and 3 shows, thanks to the implementation of the method, subject of the invention, the absence of anything exceeding the 35 dB level of the harmonic lines composing the EMC noise for the long-wave LW band of frequencies and the absence of anything exceeding the 12 dB level of the lines of the harmonics composing the EMC noise for the medium-wave MW band of frequencies.

Figure 4A:
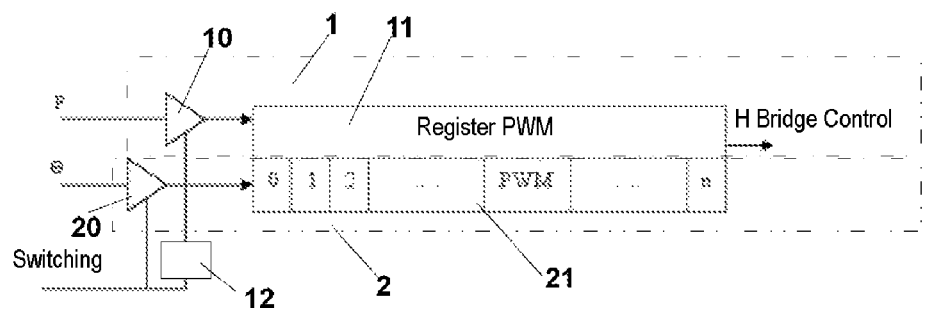
FIG. 4a shows, by way of illustration, a schematic block diagram of a device for controlling a windshield wiper motor of an automobile vehicle, subject of the invention.

The device for controlling a windshield wiper motor of an automobile vehicle powered and controlled in pulse-width modulation mode by means of an H bridge, according to the subject of the present invention, is now described in conjunction with FIG. 4a and the following figures.

With reference to the aforementioned FIG. 4a, it is indicated that the device, subject of the invention, comprises at least one module 1 for selecting and successive switching of the period of the modulated pulses between at least two discrete period values for at least one switching period Tc of given value, and a module 2 for selecting the control of the value of the duty cycle $\ominus$ of the modulated pulses, for at least one switching period Tc of the modulated pulses.

By way of non-limiting example, it is indicated that the module 1 for selecting and successive switching the period of the modulated pulses and the module 2 for selecting the control of the value of the duty cycle $\ominus$ of the modulated pulses can advantageously each be formed by a shift register comprising discrete values of period, respectively of duty cycle, or indices for calling up these values, as will be described hereinafter in the description.

Furthermore, upon observing FIG. 4a, it will be noted that the module 1 for selecting and successive switching of the period of the modulated pulses comprises at least one input circuit 10 for the choice of the period value connected to a register 11 for selecting the value of the instantaneous fundamental period of the modulated pulses, from amongst a plurality of given period values. Similarly, the module 2 for selecting and for switching the duty cycle of the modulated pulses comprises at least one input circuit 20 for the choice of the value of the duty cycle $\ominus$ of the modulated pulses and a register 21 for selecting the duty cycle of the modulated pulses from amongst a plurality of given values of duty cycle. It will of course be understood that the registers 11 and 21 are advantageously formed by the aforementioned shift registers for example.

More particularly, it is furthermore indicated that the device, subject of the invention, comprises a circuit 12 for discrimination of the instantaneous fundamental period, respectively of the duty cycle, to be applied for one or more switching periods Tc. It will, in particular, be understood that the switching control can advantageously comprise two separate controls, one executing the command for selection of the discrete period for the switching period Tc and the other executing the command for selection of the value of the duty cycle $\ominus$ applied to the modulated pulses, during one or more corresponding periods Tc.

The discrimination circuit 12 allows for example the discrimination to be carried out by serial/parallel conversion of the aforementioned control signals.

By way of non-limiting example, it is indicated that the discrimination circuit 12 constitutes a circuit for sequential discrimination of a period value from amongst a plurality of given period values. It will be understood, in particular, that in such a scenario the circuit 12 controls the input circuit 10 and in fact executes the reading of the value of the instantaneous fundamental period or of an index for calling up the latter in the shift register 11.

In the same way, it is indicated that the circuit 12 constitutes for example a circuit for sequential discrimination of a value of duty cycle from amongst a plurality of values of duty cycle, by means of the input circuit 20, and in fact executes the sequential reading of the value of the selected duty cycle or of an index for calling up the latter in the shift register 21.

Figure 4B:
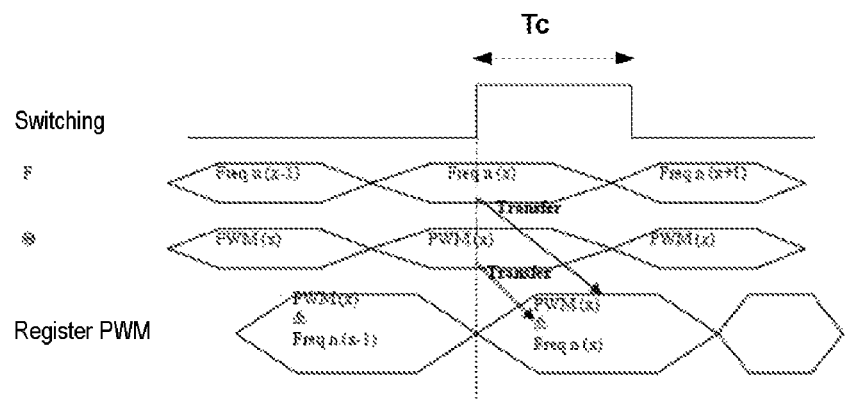
FIG. 4b shows a timing diagram of successive signals implemented by the device, subject of the invention, during the execution of a cyclic sequential switching of the period or frequency values of the modulated pulses.

FIG. 4*b* shows the sequencing of the signals implemented by the device, subject of the invention, as shown in FIG. 4*a*, over the switching period Tc. The values of the instantaneous fundamental period and of the duty cycle allow the direct control of the H bridge at the output of the registers 11 and 21.

In one specific embodiment aimed at eliminating the risk of generating EMC noise with a periodic structure, over the band of frequencies to be protected, the discrimination circuit 12 can take the form of a circuit for pseudo-random discrimination of one value of instantaneous fundamental period from amongst the plurality of given period values.

Figure 4C:
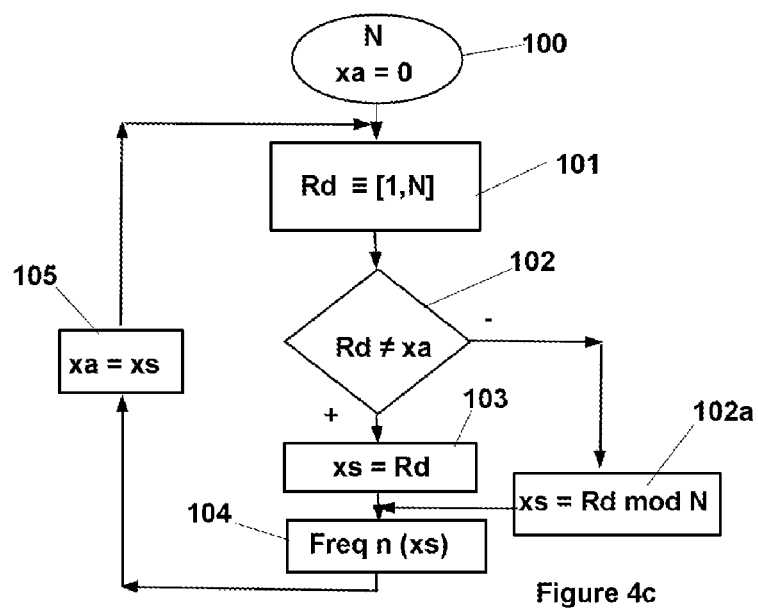
FIG. 4c shows a non-limiting flow diagram allowing an execution of a pseudo-random switching of the period or frequency values of the modulation pulses.

For this purpose, the circuit 12 can advantageously be equipped with a micro-program or with a microprogrammed circuit executing the operations illustrated in FIG. 4*c* and comprising, for example, following an initialization step 100 comprising the number N of period values available from the plurality of period values and from a value of index xa initialized at an arbitrary value, the value zero, xa=0, a step 101 for extraction of a random value Rd included within the closed interval of the values [1,N], a test step 102 for comparison of non-equality of the extracted random value Rd with the value of the initialized index xa. Upon a positive response to the test 102, a step 103, the extracted random value, xs=Rd, is assigned to a next value of index xs, and, at the step 104, the value of frequency in other words of discrete period corresponding to the index of value xs is called up by reading from the shift register 11. On the contrary, upon a negative response to the test 102, a step 102*a* is called up, allowing the extracted random value to be replaced by a value in one-to-one correspondence with the latter. By way of non-limiting example, at the step 102*a*, the value of the remainder of the division of the extracted random value Rd by the number N, xs=Rd mod N, is for example assigned to the next value of index xs. The step 102*a* is followed by a return to the step 104 for call up of the frequency, i.e. of the instantaneous fundamental period based on the corresponding next value of index xs. This allows the risk of calling up two identical values of instantaneous fundamental periods, over several successive switching periods Tc, to be eliminated.

The step 104 is itself followed by a step 105 for resetting the value of index xa at the next value of index xs, according to the equation xa=xs, then by a return to the step 101 in order to continue the process over any appropriate series of successive switching periods Tc. The execution of the micro-program for which the flow diagram is shown in FIG. 4*c* is advantageously synchronized to the switching period Tc.

A method and a device has thus been described for controlling a windshield wiper motor of an automobile vehicle which has a wide flexibility of use, owing to the access to parameters of the variables of fundamental period and of duty cycle of the modulated pulses, furthermore allowing a significant reduction in the level of emission noise over a plurality of frequency bands to be protected. In particular, the latter are not limited to the long-wave and medium-wave radio frequency bands, the method and the control device, subjects of the invention, being able to cover bands of frequencies to be protected, notably in frequency modulation, in a range of frequencies included between 10 Hz and 3 GHz.

The invention claimed is:

1. A method for controlling a windshield wiper motor of an automobile vehicle, powered and controlled in pulse-width modulation mode with a duty cycle of a given value, comprising:

successively switching an instantaneous fundamental period of the modulated pulses between at least two discrete period values, the duty cycle of the pulses being substantially established at the given value, for at least one given switching period of the modulated pulses, wherein, for two successive instantaneous fundamental periods and corresponding two successive instantaneous fundamental frequencies of said modulated pulses, a maximum value of frequency bounding the frequency jump separating the two successive instantaneous fundamental frequencies is such that harmonic frequencies of the two successive instantaneous fundamental frequencies are distinct and separated by a band width greater than a value of measurement resolution frequencies band of electromagnetic noise within a given band of frequencies to be protected.

2. The method as claimed in claim 1, wherein, for an instantaneous fundamental period and a corresponding instantaneous fundamental frequency of said modulated pulses, said instantaneous fundamental frequency is chosen so as to minimize the level of electromagnetic noise generated by the harmonic lines of said instantaneous fundamental frequency within the given band of frequencies to be protected.

3. The method as claimed in claim 1, for a plurality greater than two of discrete period values of said modulated pulses, wherein said method consists of switching the value of the fundamental period of the pulses modulated over one of the discrete period values, for a series of successive switching periods.

4. The method as claimed in claim 3, wherein said switching is a cyclic switching.

5. The method as claimed in claim 3, wherein said switching is a pseudo-random switching.

6. The method as claimed in claim 1, wherein the method furthermore consists in selecting, for at least one given switching period, the value of the duty cycle of said modulated pulses.

7. The method as claimed in claim 1, wherein the at least two discrete period values are only two discrete period values.

8. A method for controlling a windshield wiper motor of an automobile vehicle, powered and controlled in pulse-width modulation mode with a duty cycle of given value, comprising:

successively switching the instantaneous fundamental period of the modulated pulses between at least two discrete period values, the duty cycle of the pulses being substantially established at a given value, for at least one given switching period of the modulated pulses, wherein for an instantaneous fundamental period and a corresponding instantaneous fundamental frequency of said modulated pulses, said instantaneous fundamental frequency is chosen so as to minimize the level of electromagnetic noise generated by the harmonic lines of said instantaneous fundamental frequency within a band of frequencies to be protected of given value, and wherein two successive instantaneous fundamental frequencies of the modulation pulses of two successive switching periods are separated by a frequency jump included between a minimum value and a maximum value of frequency, said minimum and maximum values of frequency being a function of the band of frequencies to be protected.

9. The method as claimed in claim 8, wherein, for a given band of frequencies to be protected, the maximum value of frequency bounding the frequency jump separating two successive instantaneous fundamental frequencies is such that the harmonic frequencies of the two successive instantaneous fundamental frequencies are distinct and separated by a band width larger than a value of measurement resolution frequency band of the electromagnetic noise.

10. The method as claimed in claim 9, wherein the switching period between at least two discrete period values is less than the duration of measurement of the electromagnetic noise.

11. The method as claimed in claim 8, wherein for a given band of frequencies to be protected, the minimum value of frequency separating two successive instantaneous fundamental frequencies is such that the distance between the harmonic lines of higher order is substantially equal to a value of measurement resolution frequency band of the electromagnetic noise.

12. A device for controlling a windshield wiper motor of an automobile vehicle powered and controlled in pulse-width modulation mode by means of an H bridge, comprising:
    means for selecting and for successive switching of the instantaneous fundamental period of the modulated pulses between at least two discrete period values, for at least one given switching period; and
    means for selecting and for controlling the duty cycle of said modulated pulses for at least one switching period of the modulated pulses,
    wherein said means for selecting and successive switching of the instantaneous fundamental period of the modulated pulses comprise at least:
    one input circuit for the choice of the period value, connected to one register for selecting the value of instantaneous fundamental period of the modulated pulses, from amongst a plurality of given period values, said register controlling said H bridge.

13. The device as claimed in claim 12, further comprising a circuit for sequential discrimination of a period value from amongst a plurality of given period values.

14. The device as claimed in claim 12, further comprising a pseudo-random circuit for discrimination of a period value from amongst a plurality of given period values.

15. A device for controlling a windshield wiper motor of an automobile vehicle powered and controlled in pulse-width modulation mode by means of an H bridge, comprising:
    means for selecting and for successive switching of the instantaneous fundamental period of the modulated pulses between at least two discrete period values, for at least one given switching period; and
    means for selecting and for controlling the duty cycle of said modulated pulses for at least one switching period of the modulated pulses,
    wherein said means for selecting and for switching the duty cycle of the modulated pulses comprise at least:
    one input circuit for the choice of the value of the duty cycle of the modulated pulses; and
    one register for selecting the duty cycle of the modulated pulses from amongst a plurality of given values of duty cycle.

* * * * *